United States Patent
Ouellet et al.

(10) Patent No.: US 6,656,528 B2
(45) Date of Patent: Dec. 2, 2003

(54) METHOD OF MAKING SPECULAR INFRARED MIRRORS FOR USE IN OPTICAL DEVICES

(75) Inventors: Luc Ouellet, Granby (CA); Yves Tremblay, Brigham (CA)

(73) Assignee: Dalsa Semiconductor Inc., Waterloo (CA)

( * ) Notice: Subject to any disclaimer, the term of this patent is extended or adjusted under 35 U.S.C. 154(b) by 62 days.

(21) Appl. No.: 09/987,829

(22) Filed: Nov. 16, 2001

(65) Prior Publication Data

US 2003/0094433 A1 May 22, 2003

(51) Int. Cl.⁷ ................................. B05D 3/10
(52) U.S. Cl. .................... 427/307; 427/534; 427/576; 427/255.36; 204/192.26
(58) Field of Search ................. 427/314, 307, 427/250, 255.36, 534, 569, 576; 204/192.26

(56) References Cited

U.S. PATENT DOCUMENTS

| | | | |
|---|---|---|---|
| 4,274,706 A | | 6/1981 | Tangonan |
| 4,564,509 A | * | 1/1986 | Shealy et al. ............ 423/210.5 |
| 4,786,133 A | | 11/1988 | Gidon et al. |
| 5,447,613 A | | 9/1995 | Ouellet |
| 5,450,510 A | | 9/1995 | Boord et al. |
| 5,608,826 A | | 3/1997 | Boord et al. |
| 5,793,912 A | | 8/1998 | Boord et al. |
| 6,100,166 A | * | 8/2000 | Sakaguchi et al. .......... 438/455 |
| 6,265,287 B1 | * | 7/2001 | Tsujimura et al. .......... 438/478 |
| 6,294,441 B1 | * | 9/2001 | Yamazaki ................... 438/486 |
| 6,456,642 B1 | * | 9/2002 | Hilliard ........................ 372/55 |

OTHER PUBLICATIONS

"Vertical mirrors fabricated by deep reactive ion etching for fiber–optic switching applications", Cornel Marxer et al., Journal of Microelectromechanical Systems, pp. 559–567. Vol. 6 (3) Sep. 1997.

"Recent advances in metallization technologies for ULSI applications", Luc Ouellet et al., Report No. 238, pp. 1–7. Nov. 1992.

"Adhesion and barrier layers for CVD tungsten and PVD aluminum filled contacts and vias of various aspect ratios", M. Biberger et al., pp. 89–96. Jan. 1995.

"Elastic recoil detection using time–of–flight analysis of TiN/AISiCu/TiN/Ti contact metallization structures", S. C. Gujratl et al. 1997 Presented at the IBA–13 13$^{th}$ International Conference on Ion Beam Analysis.

"The determination of phases formed in AISiCu/TiN/Ti contact metallization structure of integrated circuits by x–ray diffraction", V. Fortin et al, J. Appl. Phys. 83(1), Jan. 1998, pp. 132–138.

\* cited by examiner

Primary Examiner—Bret Chen
(74) Attorney, Agent, or Firm—Marks & Clerk

(57) ABSTRACT

A method of making highly reflective mirrors on a wafer in the manufacture of photonic devices involves preheating a wafer to remove adsorbed volatile contaminants at a temperature between about 300 and 600° C. The wafer surface is etched at a temperature between about 300 and 600° C. to remove absorbed and chemically absorbed contaminants in the presence of a plasma to prevent poisoning. The wafer surface is thoroughly cooled so as to as reduce the surface mobility of the impinging atoms during the subsequent metallic deposition. A deposition is then carried out on the cooled wafer of a gettering layer for gettering hydrogen, oxygen and nitrogen. A metallic reflective layer is then deposited in a deposition chamber, and finally the wafer is removed from the deposition chamber to prevent excessive bulk oxidation.

17 Claims, 20 Drawing Sheets

X 2.000 nm/div
Y 400.000 nm/div

|  | Sequence 1 | Sequence 2 | Sequence 3 |
|---|---|---|---|
| 50 nm aluminium | 86.4 % | 87.3 % | 87.1 % |
| 100 nm aluminium | 87.8 % | 87.7 % | 87.5 % |
| 150 nm aluminium | 88.2 % | 88.1 % | 87.3 % |

FIG. 14

METHOD OF MAKING SPECULAR INFRARED MIRRORS FOR USE IN OPTICAL DEVICES

BACKGROUND OF THE INVENTION

1. Field of the Invention

This invention relates to the field of photonics, and in particular to a method of making specular infrared mirrors for use in optical devices, such as multiplexers and demultiplexers for use in wavelength division multiplex communication systems.

2. Description of Related Art

The manufacture of optical devices such as multiplexers and demultiplexers requires the fabrication of a highly reflective infrared mirror in the 1.55 µm and/or 1.30 µm optical bands. Such a highly reflective infrared mirror is typically required on the sidewall of deep vertical-etched optical components to reflect an infrared laser beam with maximum efficiency.

Typical fabrication techniques of infrared mirrors result in relatively poor surface quality, in lower reflectivity values at 1.55 µm wavelength and in significant optical losses from infrared light scattering from the surface defects.

Optical multiplexers and demultiplexers have been described in the scientific literature for at least 20 years. The following USA patents and published technical information will review the various manufacturing techniques used to produce the highly reflective infrared mirror of multiplexers, demultiplexers and other infrared optical devices:

U.S. Pat. No. 4,274,706, Hughes Aircraft Company

This patent describes the mirror of infrared multiplexers and demultiplexers shown in FIGS. 1a and 1b. The multiplexers and demultiplexers incorporating the mirror allowing the reflection of infrared light are manufactured using a sodium glass microscope slide substrate; a planar wave guide produced by increasing the refractive index of the surface of this substrate to a depth of about 100 µm using an ion exchange process replacing the sodium atoms of the substrate by lithium atoms from a $LiSO_4$ salt heated at about 580° C. in oxygen; a grind-and-polished cylindrical shaped surface transverse to the surface of the glass substrate as to achieve the curved wave guide of radius R of FIG. 1a (This cylindrical transverse surface is used to focus the light emanating from the input plane (identified as 14 in FIG. 1b) back to the input plane and has a series of parallel grooves forming a series of pairs of facets of uniform spacing); a replica grating comprising a 0.005 inch thick acetate plastic film having 512 grooves/mm coated with an aluminum as to achieve high reflectivity; and an epoxy glue to bond this transversal cylindrical shaped surface to the replica grating.

This manufacturing technique involves the gluing of an aluminum coated thin flexible material such as an acetate plastic film onto a grind-and-polished sodium glass microscope slide. No further detail on the mirror characteristics and/or fabrication technique is given.

U.S. Pat. No. 4,786,133, Commissariat à l'énergie atomique

This U.S. patent describes the mirror of the infrared multiplexers and demultiplexers shown on FIGS. 2a and 2b. The multiplexers and demultiplexers incorporating the mirror allowing the reflection of infrared light is manufactured using a silicon substrate, identified as 20 in FIG. 2b; a stack of three transparent silica layers, identified as 22, 24 and 26 in FIG. 2b, with the intermediate 4 to 5 µm thick phosphorus-doped silica layer 24 having a 10-3 to 10-2 higher refraction index than the lower 6 to 8 µm thick undoped silica layer 22 and the upper 6 to 8 µm thick undoped silica layer 26 surrounding it; a plurality of optical microguides, identified as $G_1$ to $G_N$ in FIG. 2a; a concave and elliptic shaped reflective diffraction grating, identified as R in FIG. 2a, constituted by etched facets etched in the stack of three layers; and an aluminum metal layer, identified as 28 in FIG. 2b.

This manufacturing technique involves the vertical etching of facets through a three-layer optical waveguide followed by an aluminum coating. No detail is given on the aluminum coating fabrication technique.

U.S. Pat. Nos. 5,450,510, 5,608,826 and 5,793,912, APA Optics, Inc.

These three USA patents describe the mirror of similar variations of the infrared wavelength division multiplexed optical modulator shown in FIGS. 3a and 3b. The infrared wavelength division multiplexed optical modulator incorporating the mirror allowing the reflection of infrared light is assembled using a wavelength dispersive multiplexer transmitter, identified as 21 in FIG. 3a, and consisting of a laser power and laser temperature control circuitry, identified as 23 in FIG. 3a, used to maintain the laser power and temperature at stable pre-set values; a directional coupler controller, identified as 24 in FIG. 3a, used to control the integrated modulator; a semiconductor laser diode, identified as 26 in FIG. 3, maintained at constant temperature as to minimise wavelength variations of about 0.0005 µm/° C.; a first reflective holographic diffraction grating, identified as 27 in FIG. 3a, used to demultiplex the various wavelengths from each other with a 0.0007 µm separation by using a series of 6190/cm parallel grooves replicated in its surface and overcoated with a reflecting material such as aluminum; a first collimating optics, identified as 28 in FIG. 3a, used to collimate the output beam of the laser diode; a first focusing optics, identified as 29 in FIG. 3a, used to inject the collimated output beam into the external integrated modulator; a mirror, identified as 30 in FIG. 3a, used to reflect the laser diode beam toward the diffraction grating; an integrated modulator, identified as 31 in FIG. 3b, used to attenuate the various wavelengths of the separated beam and used as a directional coupler of the separated beams into the optical fibre; an optical fibre, identified as 21 in FIG. 3a, used to connect the wavelength dispersive multiplexer transmitter and the wavelength dispersive multiplexer receiver; a wavelength dispersive multiplexer receiver, identified as 22 in FIG. 3a, and consisting of a detector array controller, identified as 25 in FIG. 3a, used to control the detector array; a second reflective holographic diffraction grating, identified as 27' in FIG. 3a, used to multiplex the various wavelengths together and also consisting in a series of 6190/cm parallel grooves ruled or replicated in its surface and overcoated with a reflecting material such as aluminum; a second collimating optics, identified as 28' in FIG. 3a, used to focus the dispersed wavelengths onto the detector array; a second focusing optics, identified as 29' in FIG. 3a, used to collimate the multiple wavelength light coming out of the optical fibre with a minimum angular dispersion; a detector array, identified as 32 in FIG. 3a, used to detect the dispersed longitudinal modes; and the two reflective holographic diffraction gratings of this infrared wavelength division multiplexed optical modulator involve an aluminum coating. No detail is given on the aluminum coating fabrication technique.

The highly reflective infrared mirror from Newport Corporation

Newport Corporation, Irvine, Calif., is a worldwide manufacturer and distributor of precision components and systems used for development and application of laser and optical technologies in semiconductor manufacturing and testing, fiber optic communications and other commercial applications. The reflectivity spectra of the ER.1 enhanced aluminum coating near infrared mirror is shown in FIG. 4.

These reflectivity spectra will be used as comparative reference the results for the present invention.

Marxer C. and Al, Vertical mirrors fabricated by deep reactive ion etching for fiber-optics switching applications. Journal of Microelectromechanical Systems, Vol 6 (3), pp. 277–285. September 1997

This paper describes the characteristics and performance of various metal-coated silicon mirrors to be used for electrostatic switches capable of switching 1.3 $\mu$m infrared light from optical fibres. The electrostatic switch is shown in FIG. 5a. This paper also describes different metal coatings such as gold, aluminum, nickel and chromium and concludes that as shown in FIG. 5b, the 1.3 $\mu$m reflectivity of aluminum-coated silicon increases with increasing aluminum thickness but saturates to the reflectivity of bulk aluminum when the thickness attains 40 nm; only 100 nm of aluminum is required as to prevent the transmission of less than 1 ppm (60 dB isolation) at 1.3 $\mu$m wavelength; the other two metals, nickel and chromium, exhibit inferior reflectivity values at 1.3 $\mu$m wavelength even for much thicker mirrors; higher reflectivity values are associated to thicker aluminum but the surface roughness associated with thicker aluminum induces a non-specular reflectivity and overall light loss due to diffused light scattering estimated by the following formula:

$$P_{scat}=P_{tot}\{1-exp[-(4\pi\sigma cos\theta_1/\lambda)^2]\}$$

where $P_{scat}$ is the flux of light scattered away from the specular direction, $P_{tot}$ is the total reflected flux, $\sigma$ is the RMS surface roughness of the mirror, $\theta_1$ is the incident angle and $\lambda$ is the wavelength of light.

The surface roughness can be measured using an Atomic Force Microscope (AFM) profiling of the aluminum surface and the reduction of the surface roughness is key to achieve a highly reflective specular infrared mirror. An example of such AFM profiling is shown in FIG. 5c.

An object of the present invention is to provide an improved fabrication process for a low surface roughness highly-reflective specular infrared mirror so as to allow the fabrication of optical devices such as multiplexers, demultiplexers and other optical devices operating in the 1.55 $\mu$m and/or 1.30 $\mu$m optical bands with minimum optical losses.

SUMMARY OF THE INVENTION

The present invention provides a novel approach for producing an atomic scale surface roughness aluminum mirror with high infrared specular reflectivity, for example, using a commercially available M2i cluster tool manufactured by Novellus Systems in California, USA. This highly reflective infrared mirror is to be coated onto the facets of a deep-etched grating such as the one shown in FIG. 6.

Accordingly the present invention provides a method of making highly reflective mirrors on a wafer in the manufacture of photonic devices, comprising the steps of preheating a wafer to remove adsorbed volatile contaminants at a temperature between about 300 and 600° C.; etching the wafer surface at a temperature between about 300 and 600° C. to remove absorbed and chemically absorbed contaminants in the presence of a glow-discharge to reduce poisoning; thoroughly cooling the wafer surface so as to as reduce the surface mobility of the impinging metal atoms during a subsequent metallic deposition; carrying out a deposition on the cooled wafer of a gettering layer for gettering at least one contaminant selected from the group consisting of hydrogen, oxygen and nitrogen; depositing a metallic reflective layer in a deposition chamber; and removing the wafer from the deposition chamber to prevent excessive bulk oxidation.

The invention is useful in the manufacture of echelle gratings in multplexers and demultplexers, especially in the infrared region.

BRIEF DESCRIPTION OF THE DRAWINGS

The invention will now be described in more detail, by way of example only, with reference to the accompanying drawings, in which:

FIG. 14 shows the effect of the deposition sequence on the 440 nm ultra-violet reflectivity of a highly reflective infrared mirror;

DESCRIPTION OF THE PREFERRED EMBODIMENTS

An exemplary fabrication process for a low surface roughness highly reflective specular infrared mirror will now be described.

Figure 7:
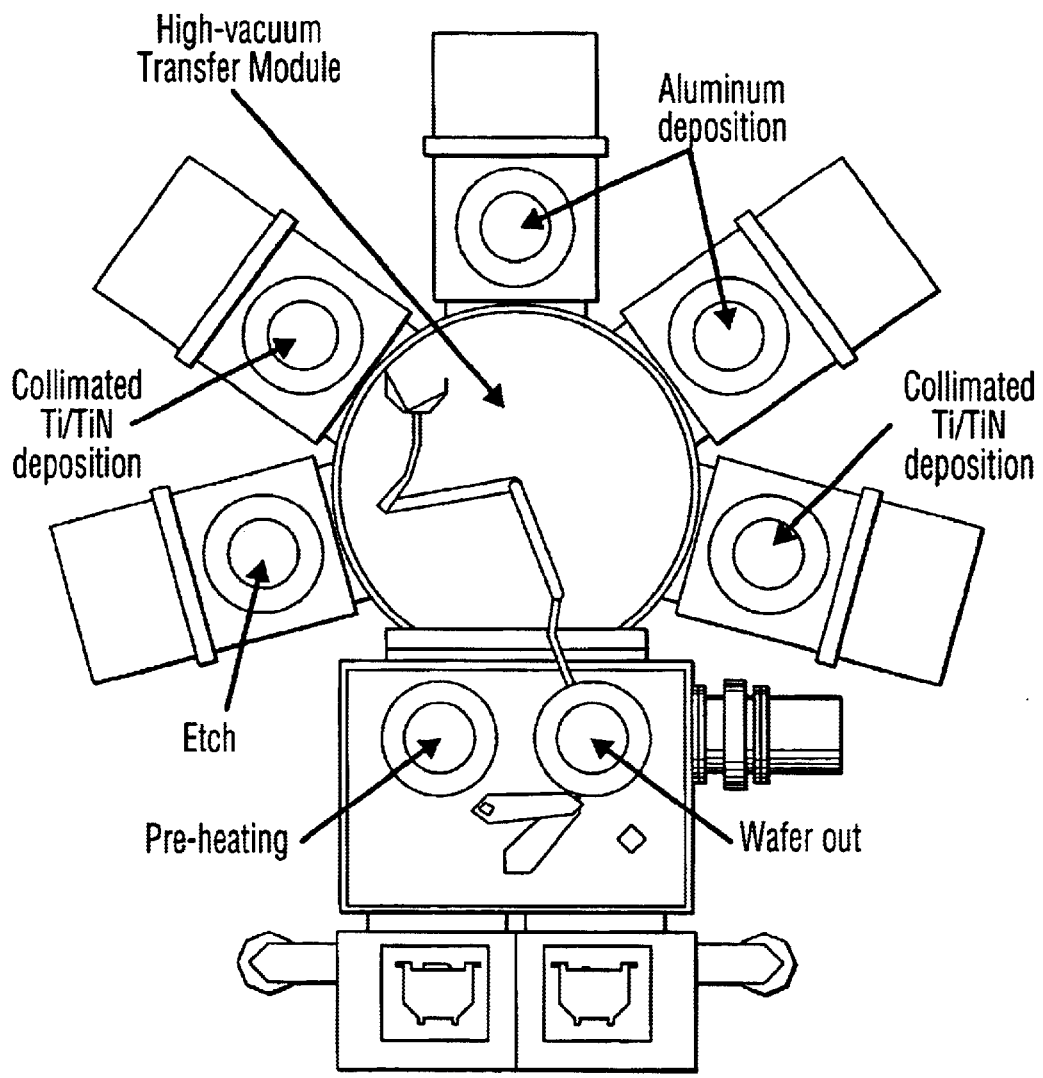
FIG. 7 shows a Novellus M2i cluster tool.

As shown in FIG. 7, an M2i cluster tool is equipped with a custom-made vacuum preheating station capable of heating the wafer under vacuum up to a maximum temperature of about 550° C. prior to its loading in a high-vacuum transfer module; a very-high-vacuum etch chamber capable of cooling the wafer after the completion of the etching; two custom-made very-high-vacuum collimated titanium and titanium nitride deposition chambers capable of depositing titanium and/or titanium nitride through a collimator; and two very-high-vacuum aluminum deposition chambers.

Figure 8:
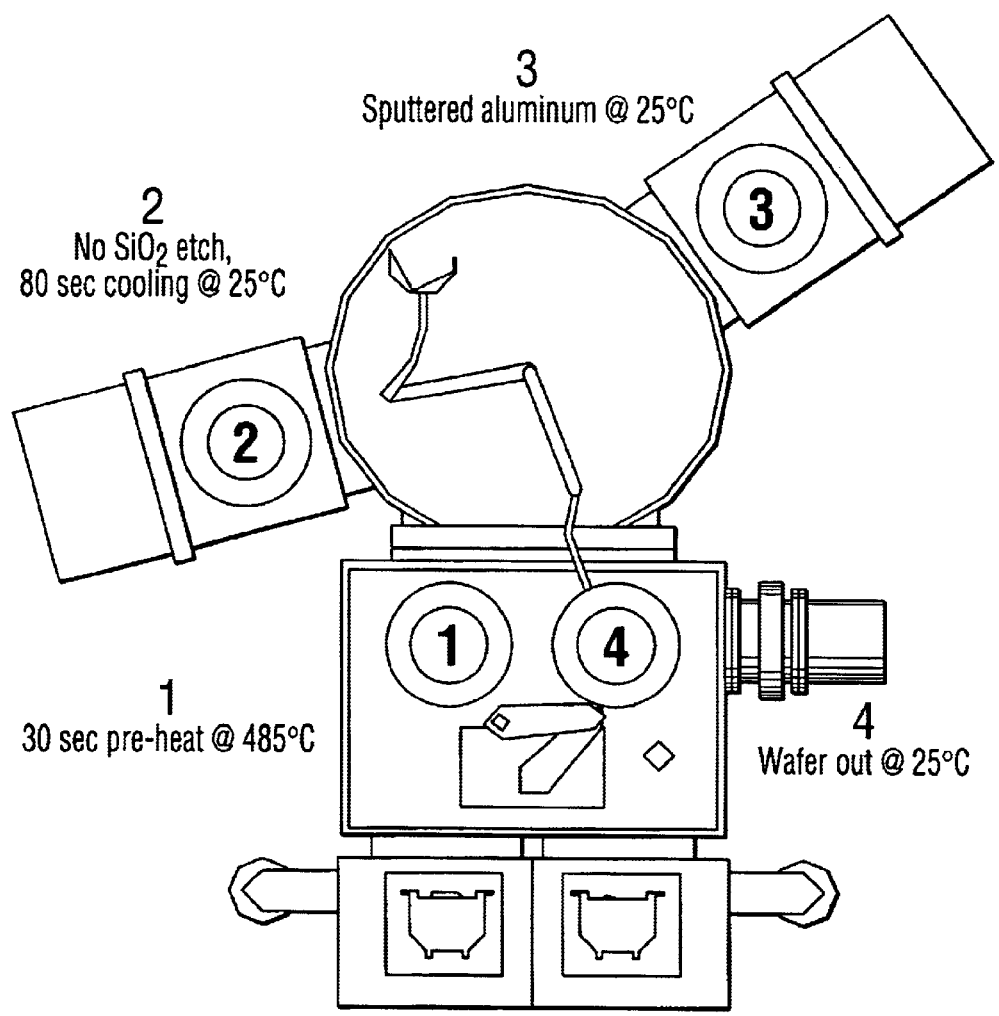
FIG. 8 shows a first deposition sequence (Sequence 1) in a Novellus M2i cluster tool.

The description and performance of these two custom-made very-high-vacuum collimated titanium and titanium nitride deposition chambers are documented in the scientific literature by the inventors of the following publications, which are hereby incorporated herein by reference: Recent advances in metallization technologies for ULSI applications—Collimated Ti/TiN for 0.50 & 0.35 μm technologies, Semicon Korea, November 1992, Varian technical report No. 238; Adhesion and barrier layers for CVD tungsten and PVD aluminum filled contacts and vias of various aspect ratios, Semicon Korea, Seoul, Jan. 19, 1995; Elastic recoil detection using time-of-flight analysis of TiN/AlSiCu/TiN/Ti contact metallization structures, IBA-13, Thirteenth International Conference on Ion Beam Analysis, Sacavém, Portugal, Jul. 27$^{th}$ 1997, E.N. 10, 2685; The determination of the phases formed in AlSiCu/TiN/Ti contact metallization structure on integrated circuits by X-ray diffraction, J. Appl. Phys., 83 (1), January 1998, p. 132–138;

Three deposition sequences for making highly reflective infrared mirrors will now be described:

FIG. 8 illustrates Sequence 1:
i. 30 seconds pre-heating at 485° C. as to reduce the adsorbed volatile contaminants such as water vapour;
ii. No etch at 485° C;
iii. 80 sec cooling at 25° C. as to chill the surface of the wafer;
iv. 50 nm, 100 nm or 150 nm aluminum mirror deposition at 25° C. as to minimise grain growth;
v. Wafer out at 25° C. as to prevent excessive bulk oxidation.

Figure 9:
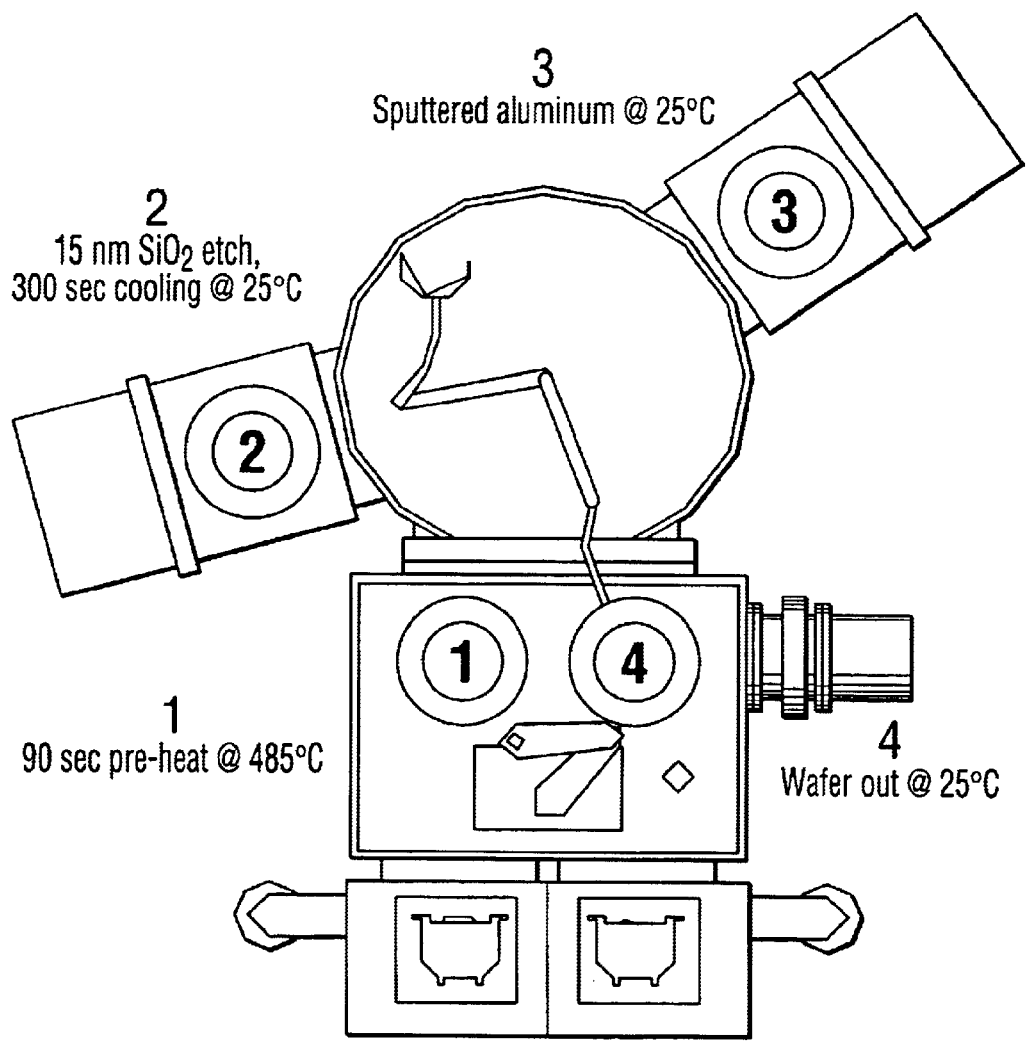
FIG. 9 shows a second deposition sequence (Sequence 2) in a Novellus M2i cluster tool.

FIG. 9 describes Sequence 2:
i. 90 seconds pre-heating at 485° C. as to thoroughly eliminate the adsorbed volatile contaminants such as water vapour;
ii. 15 nm $SiO_2$ etch at 485° C. so as to thoroughly eliminate the absorbed and chemically absorbed contaminants such as water vapour absorbed as Si—OH and Si—H using an argon plasma and a high wafer temperature of 485° C. in conformance with our U.S. Pat. No. 5,447,613: Preventing of via poisoning by glow discharge induced desorption;
iii. 300 sec cooling at 25° C. as to as to thoroughly cool the surface of the wafer and reduce the surface mobility of the impinging aluminum atoms during the following aluminum deposition;
iv. 50 nm, 100 nm or 150 nm aluminum mirror deposition at 25° C. as to minimise surface diffusion and grain growth;
v. Wafer out at 25° C. as to prevent excessive bulk oxidation.

Figure 10:
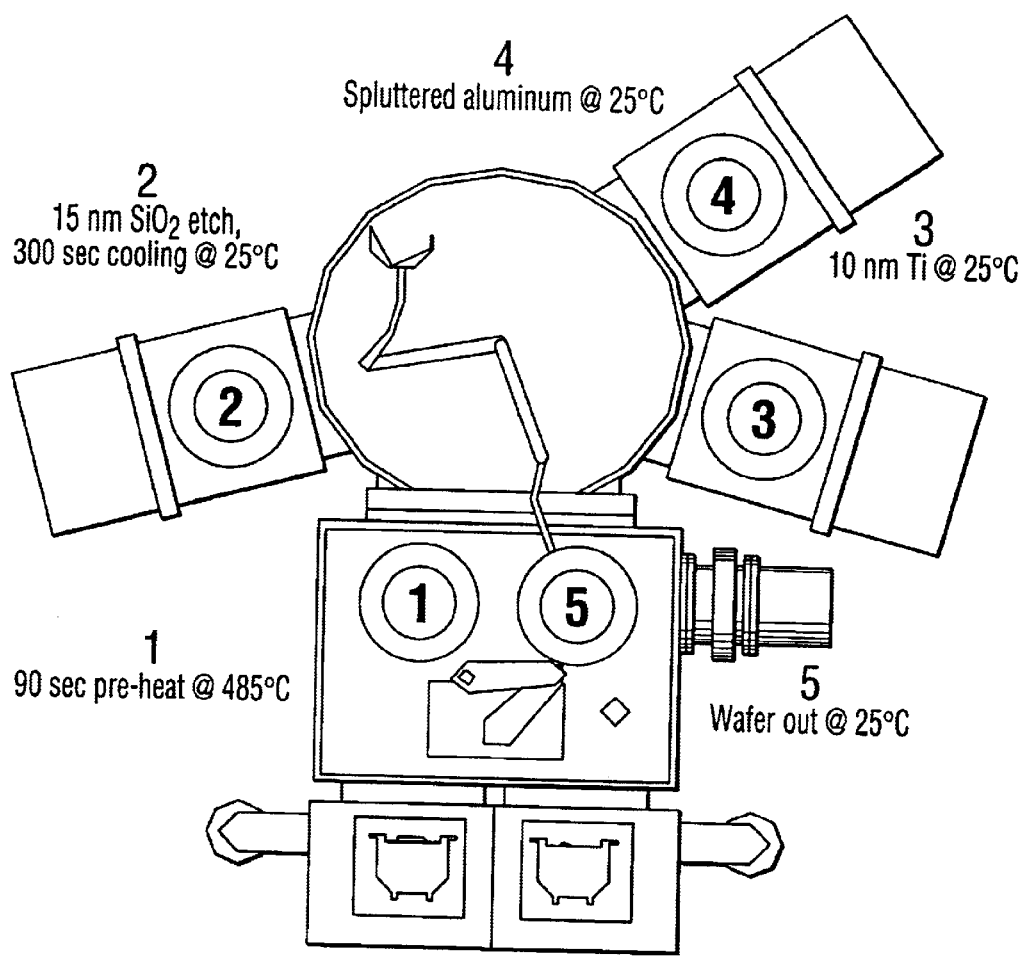
FIG. 10 shows a third deposition sequence (Sequence 3) in a Novellus M2i cluster tool.
Figure 11:
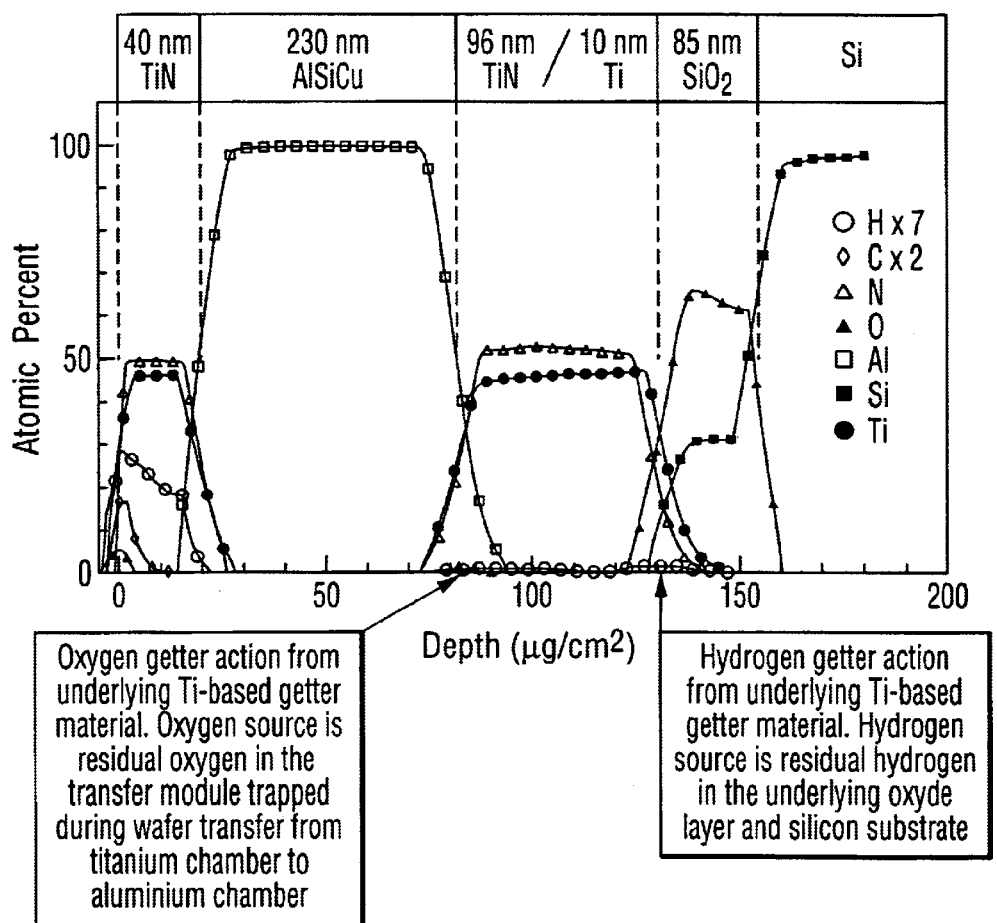
FIG. 11 shows the hydrogen and oxygen getter from an integrated titanium-based layer deposited under the aluminum layer.

FIG. 10 describes Sequence 3:
i. 90 seconds pre-heating at 485° C. as to eliminate the adsorbed volatile contaminants such as water vapour;
ii. 15 nm $SiO_2$ etch at 485° C. so as to thoroughly eliminate the absorbed and chemically absorbed contaminants such as water vapour absorbed as Si—OH and Si—H using an argon plasma and a high wafer temperature of 485° C. in conformance with our U.S. Pat. No. 5,447,613: Preventing of via poisoning by glow discharge induced desorption;
iii. 300 sec cooling at 25° C. as to as to thoroughly cool the surface of the wafer and reduce the surface mobility of the impinging aluminum atoms during the following aluminum deposition;
iv. 10 nm collimated titanium deposition at 25° C. so as to deposit a hydrogen, oxygen and nitrogen gettering layer under the following aluminum layer, as demonstrated by FIG. 11 taken from our publication: Elastic recoil detection using time-of-flight analysis of TiN/AlSiCu/TiN/Ti contact metallization structures, IBA-13, Thirteenth International Conference on Ion Beam Analysis, Sacavém, Portugal, July 27$^{th}$ 1997, E.N. 10, 2685;
v. 50 nm or 100 nm or 150 nm aluminum mirror deposition at 25° C. as to minimise surface diffusion and grain growth;
vi. Wafer out at 25° C. as to prevent excessive bulk oxidation.

Atomic Force Miscroscopy (AFM) measurements of the surface roughness of the highly reflective infrared mirrors:

As discussed in Marxer's paper, an increasing thickness aluminum mirror allows a higher infrared reflectivity but the surface roughness associated with a thicker aluminum mirror induces a non-specular reflectivity and an overall light loss due to diffused light scattering from an increasing RMS surface roughness of the mirror. The RMS surface roughness of 50 nm, 100 nm and 150 nm thick highly-reflective infrared mirrors deposited by the three upper-mentioned deposition sequences was measured using a Digital Instrument Nanoscope Atomic Force Microscope (AFM) over a 3.0 μm by 3.0 μm area at a scan rate of 1.585 Hz and using a sample size of 256.

Figure 12:
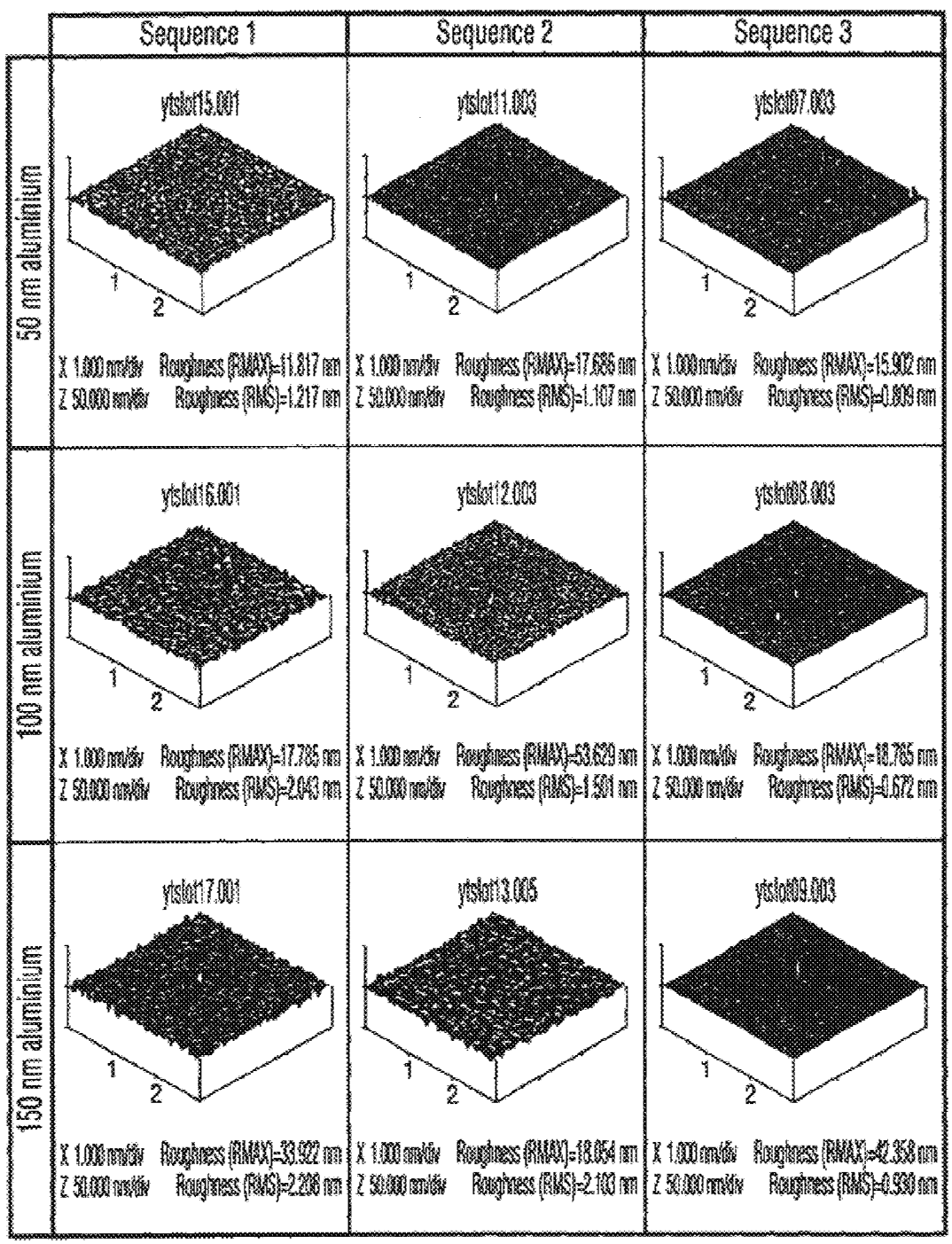
FIG. 12 shows the effect of the deposition sequence on the surface roughness of a highly reflective infrared mirror.

The obtained three-dimensional profiles using a 50 nm scale are shown in FIG. 12. It is clear from the AFM profiles of FIG. 12 that the deposition sequence used to deposit a given thickness aluminum mirror has a very important effect on its resulting RMS surface roughness.

Figure 13:
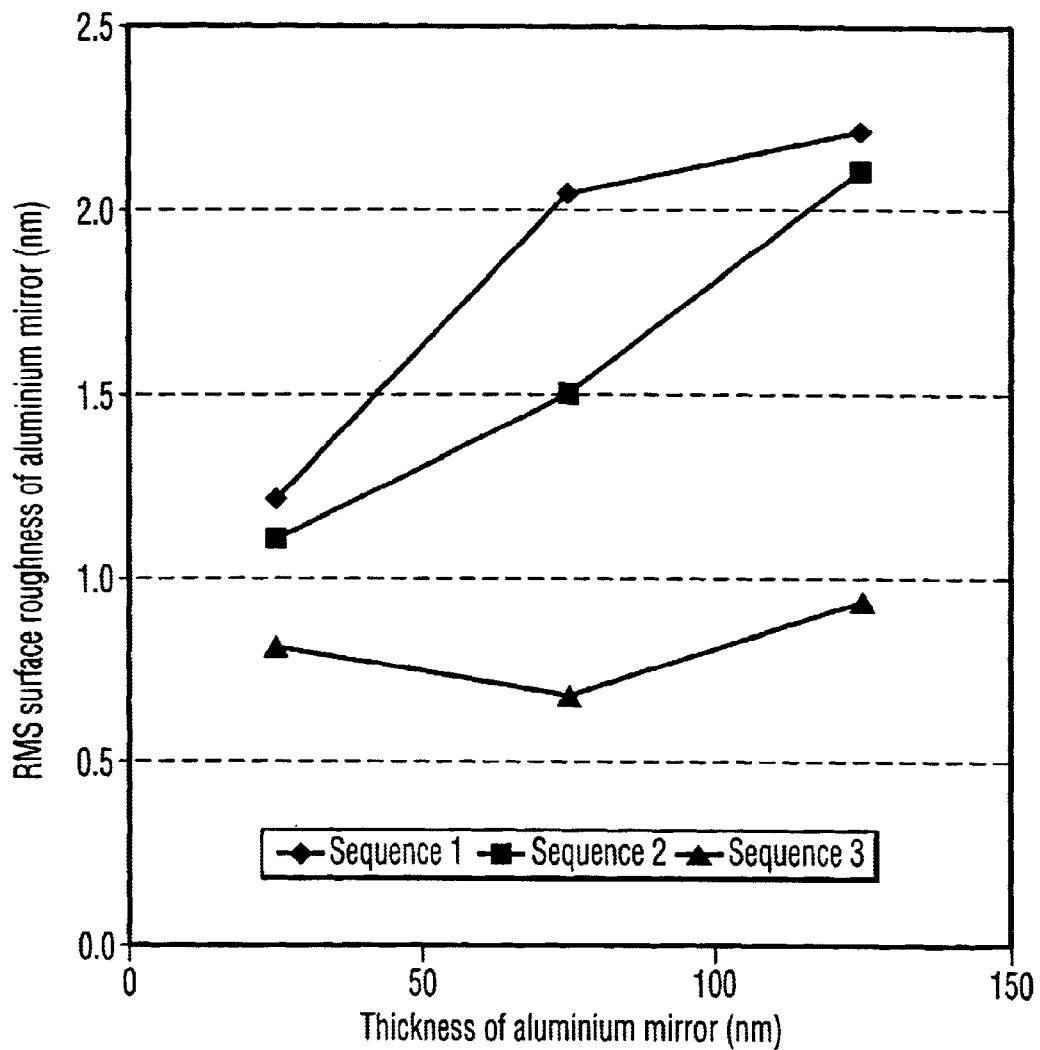
FIG. 13 shows the effect of the deposition sequence on the RMS surface roughness of a highly reflective infrared mirror.

FIG. 13 plots the resulting RMS surface roughness of 50 nm, 100 nm and 150 nm thick highly reflective infrared mirrors deposited using the three upper-described sequences. It is clear that Sequence 1 and Sequence 2 result in increased surface roughness as the thickness of the mirrors deposited by these two sequences is increased from 50 nm to 150 nm; and the surface roughness of the mirrors deposited with Sequence 3 is maintained constant to less than about 1.0 nm as their thickness is increased from 50 nm to 150 nm.

Knowing that the diameter of an aluminum atom is 0.364 nm, it is clear that Sequence 3 is capable of depositing up to 150 nm thick aluminum mirrors with a surface roughness of less than three atoms.

Ultra-violet reflectivity measurements of the highly reflective infrared mirrors:

The ultra-violet reflectivity of the 50 nm, 100 nm and 150 nm thick highly reflective infrared mirrors deposited by Sequence 1, Sequence 2 and Sequence 3 was measured using a Prometrix FT-750 reflectometer operating at a 440 nm wavelength.

Figure 1A:
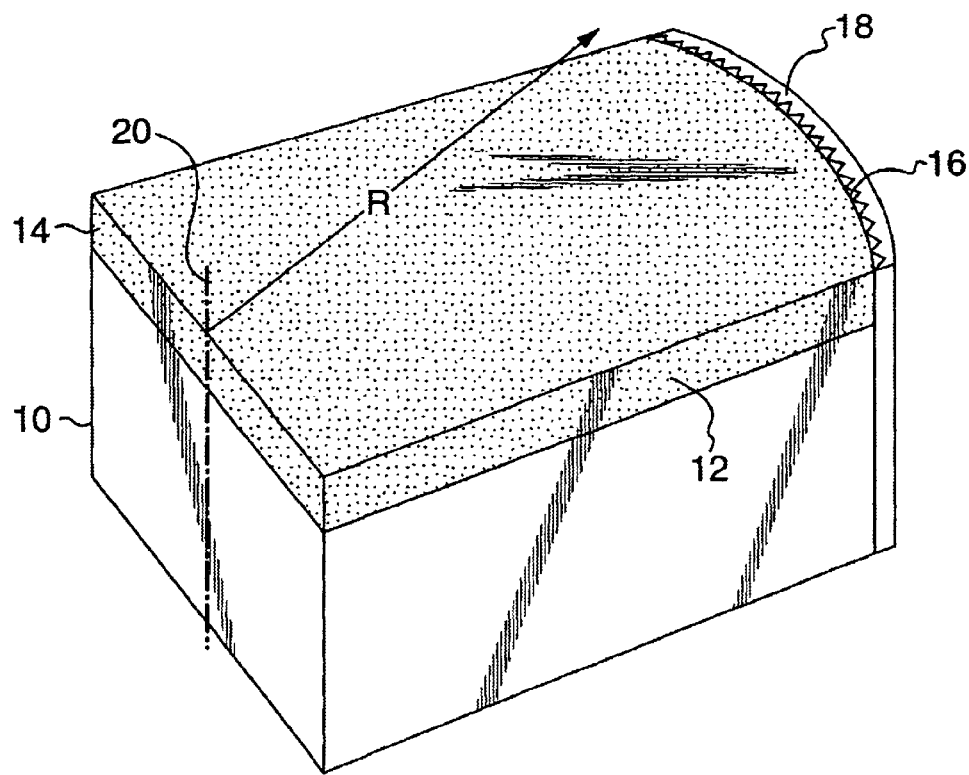
FIGS. 1a and 1b illustrate a prior art reflective diffraction grating disclosed in U.S. Pat. No. 4,274,706.
Figure 1B:
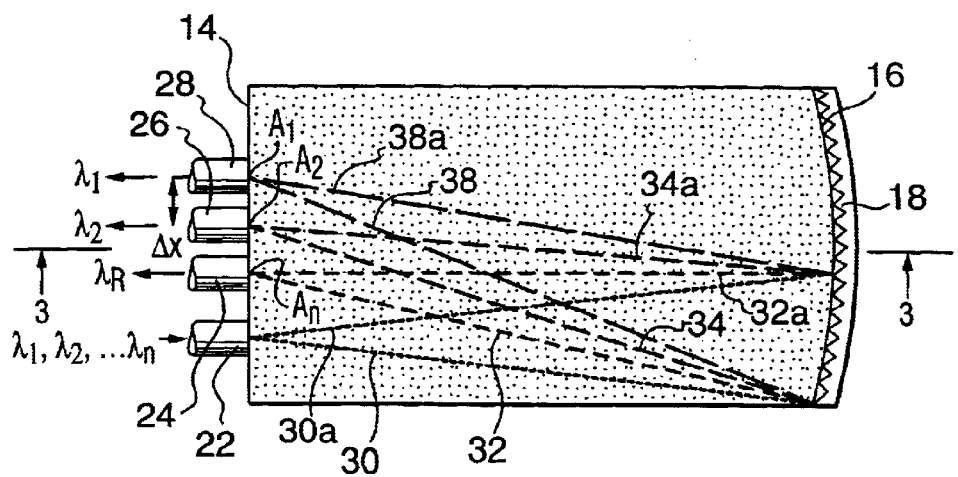
Figure 2A:
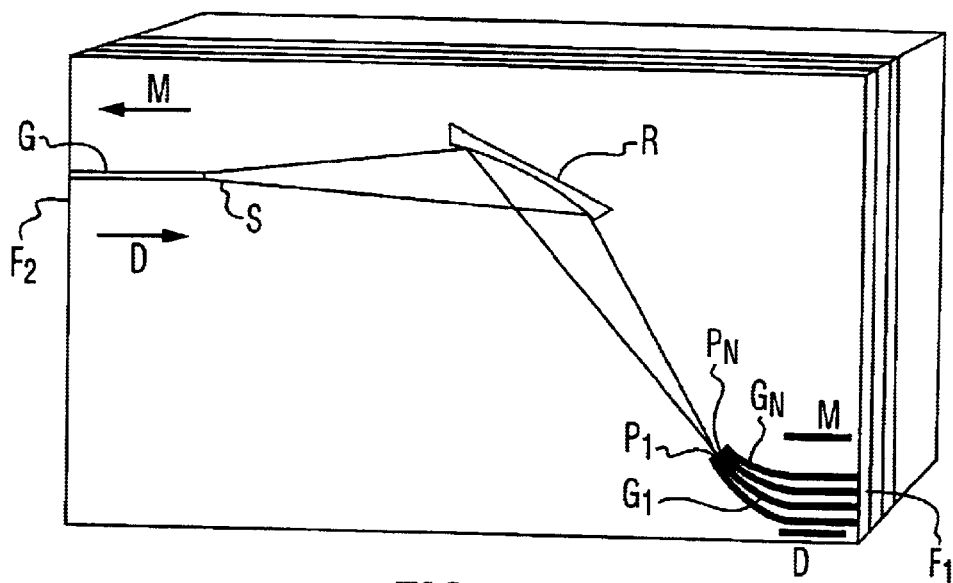
FIGS. 2a and 2b illustrate a prior art reflective diffraction grating disclosed in U.S. Pat. No. 4,786,133.
Figure 2B:
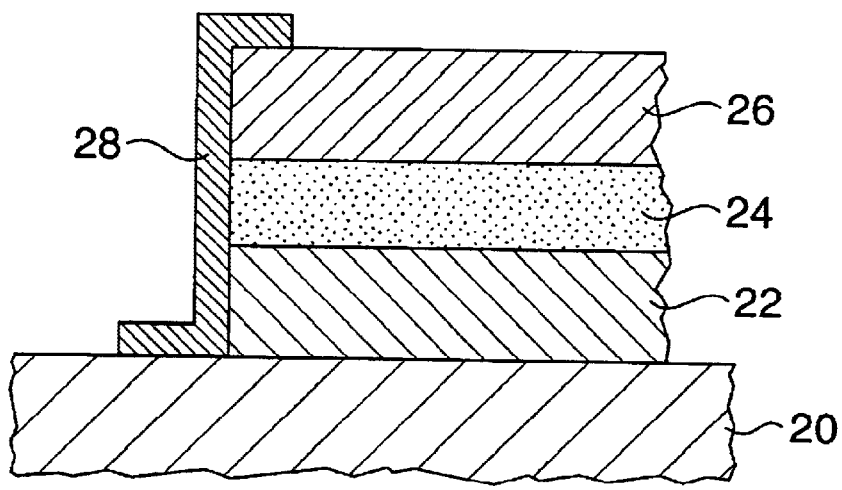
Figure 3A:
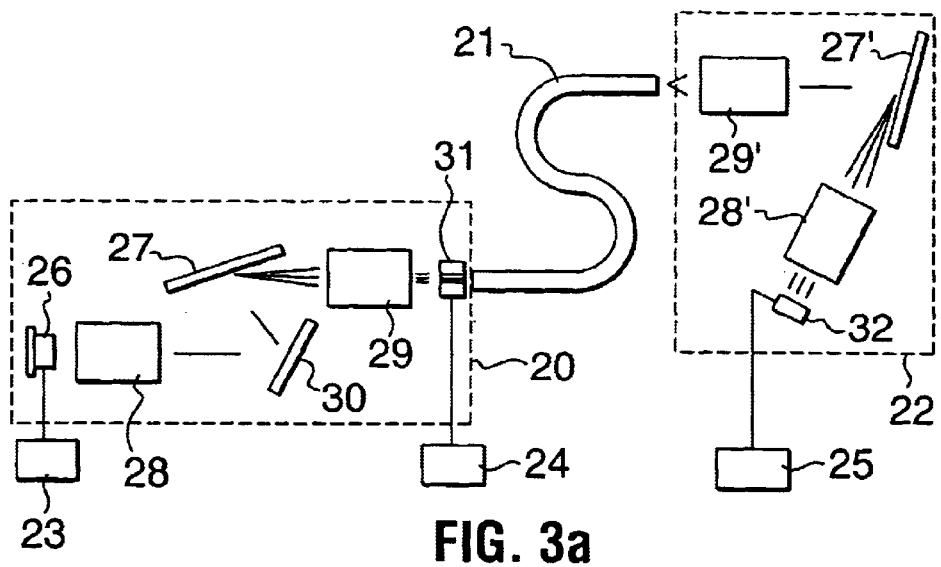
FIGS. 3a and 3b illustrate a prior art a multiplexer/demultiplexer disclosed in U.S. Pat. No. 5,450,510.
Figure 3B:
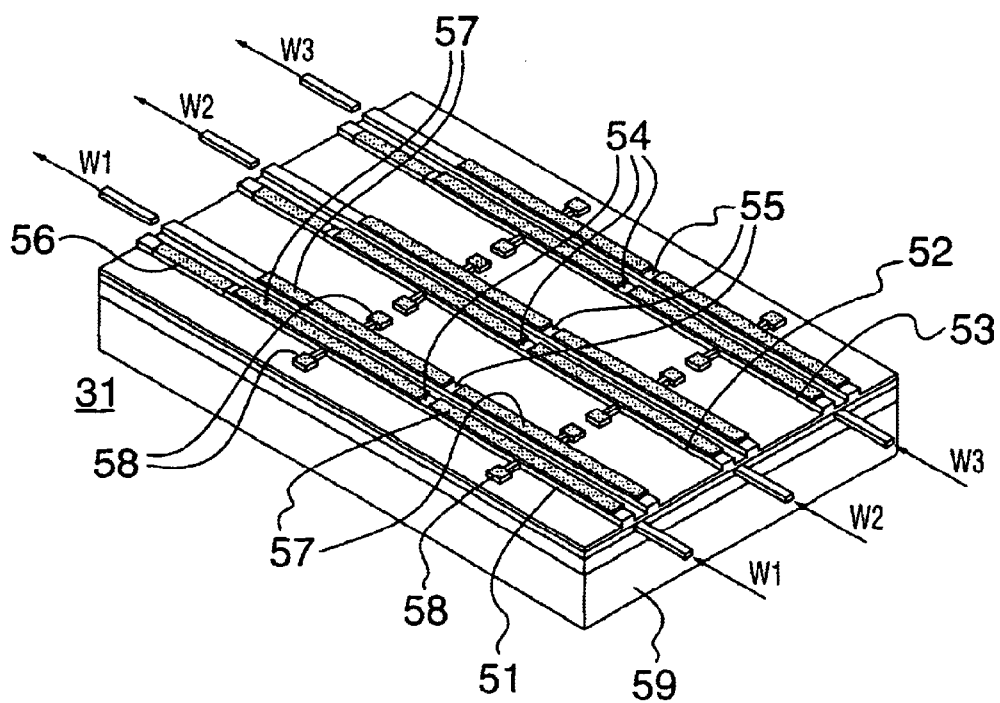
Figure 4:
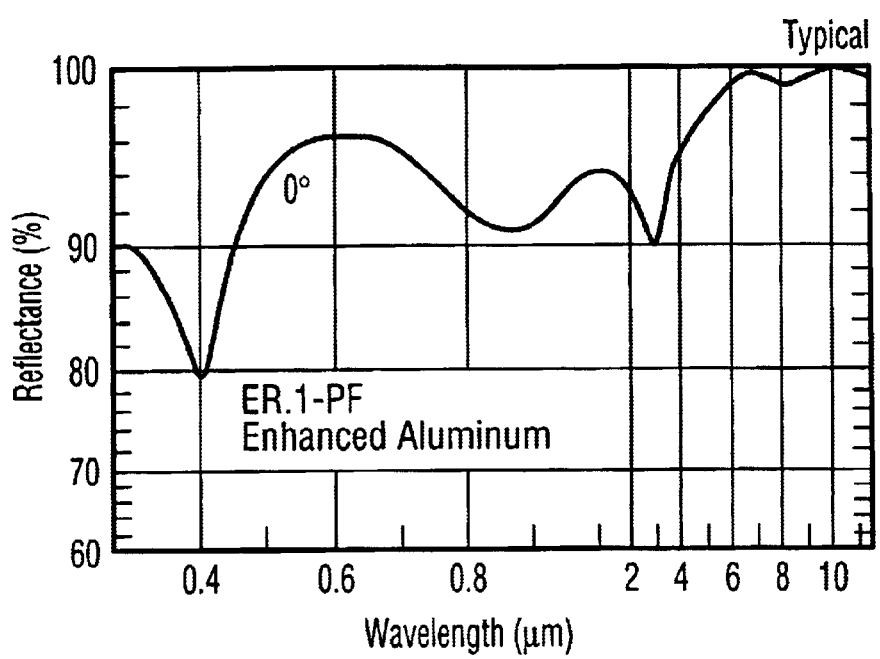
FIG. 4 illustrates the optical properties of the enhanced aluminum mirror ER.1-PF (Newport Corporation, Irvine, Calif.)
Figure 5A:
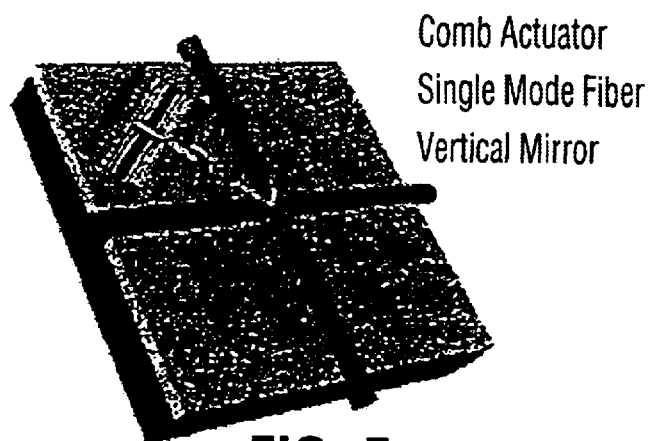
FIGS. 5a–c illustrate the effect of surface roughness of the mirror on the performance of optical switches (From Marxer's paper)
Figure 5B:
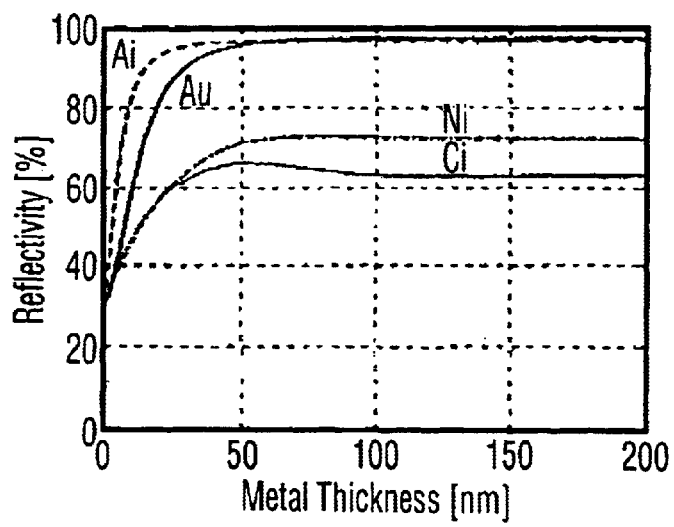
Figure 5C:
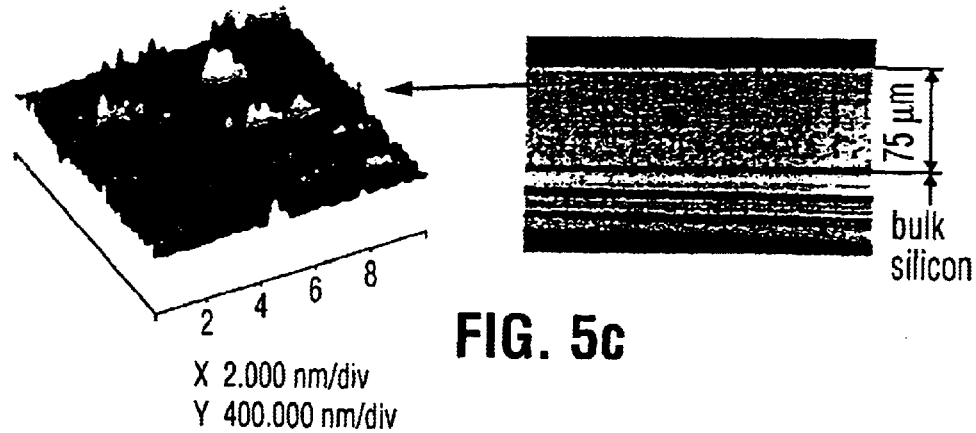
Figure 6:
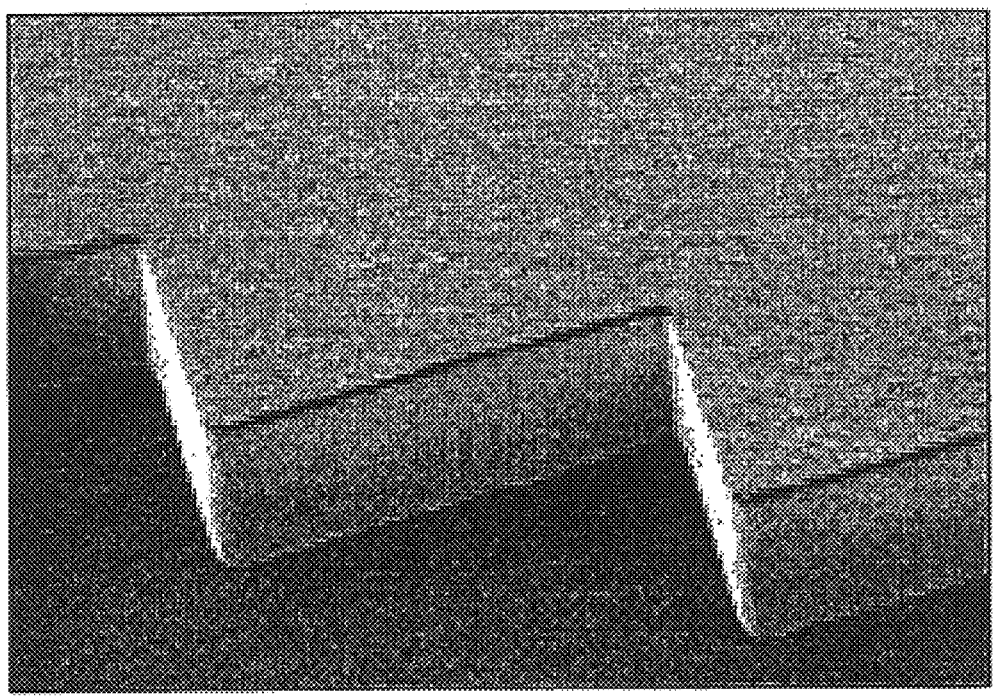
FIG. 6 shows the deep-etched grating facets on which a highly reflective infrared mirror is to be coated.

The measurements reported in FIG. 14 indicate that there are very little differences between the 440 nm ultra-violet reflectivity of the various mirrors deposited by Sequence 1, Sequence 2 and Sequence 3; the 440 nm ultra-violet reflectivity of the various mirrors matches the reported value of the highly-reflective ER.1 enhanced aluminum coating near infrared mirror of Newport Corporation shown in FIG. 4. Fourier Transformed Infrared Reflectivity (FTIR) measurements of the specular infrared reflectivity of the aluminum mirrors The specular infrared reflectivity of the 50 nm, 100 nm and 150 nm thick highly reflective infrared mirrors deposited by Sequence 1, Sequence 2 and Sequence 3 was measured by Fourier Transformed Infrared Reflectivity (FTIR).

Figure 15:
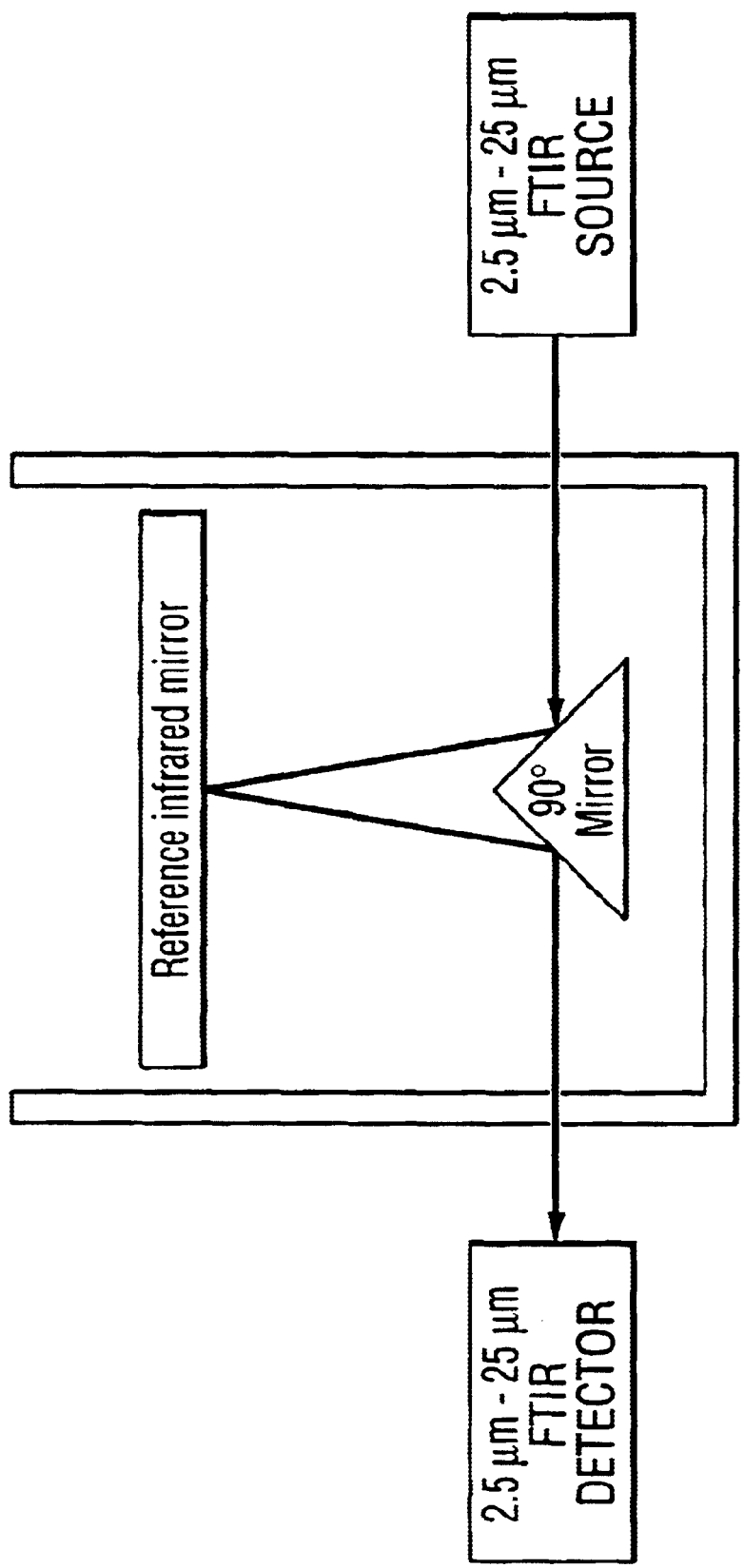
FIG. 15 shows the FTIR calibration prior to measurement of a highly reflective infrared mirror.

FIG. 15 shows the FTIR set-up used for the calibration of the specular reflectivity measurements. This calibration set-up uses a source of infrared light; a properly aligned mirror-coated reflection prism ensuring the measurement of the specular reflectivity of a mirror sample via a double reflection at the surface of the prism; a calibration mirror with maximum reflectivity from 2.5 $\mu$m to 25 $\mu$m; a detector, capable of measuring the wavelength dependence of the reflectivity using the infrared light twice reflected by the mirror-coated prism and once reflected by the calibration mirror; a computer which memorizes the obtained calibration spectra used as reference to compare the specular infrared reflectivity of the 50 nm, 100 nm and 150 nm thick highly-reflective infrared mirrors deposited by Sequence 1, Sequence 2 and Sequence 3.

Figure 16:
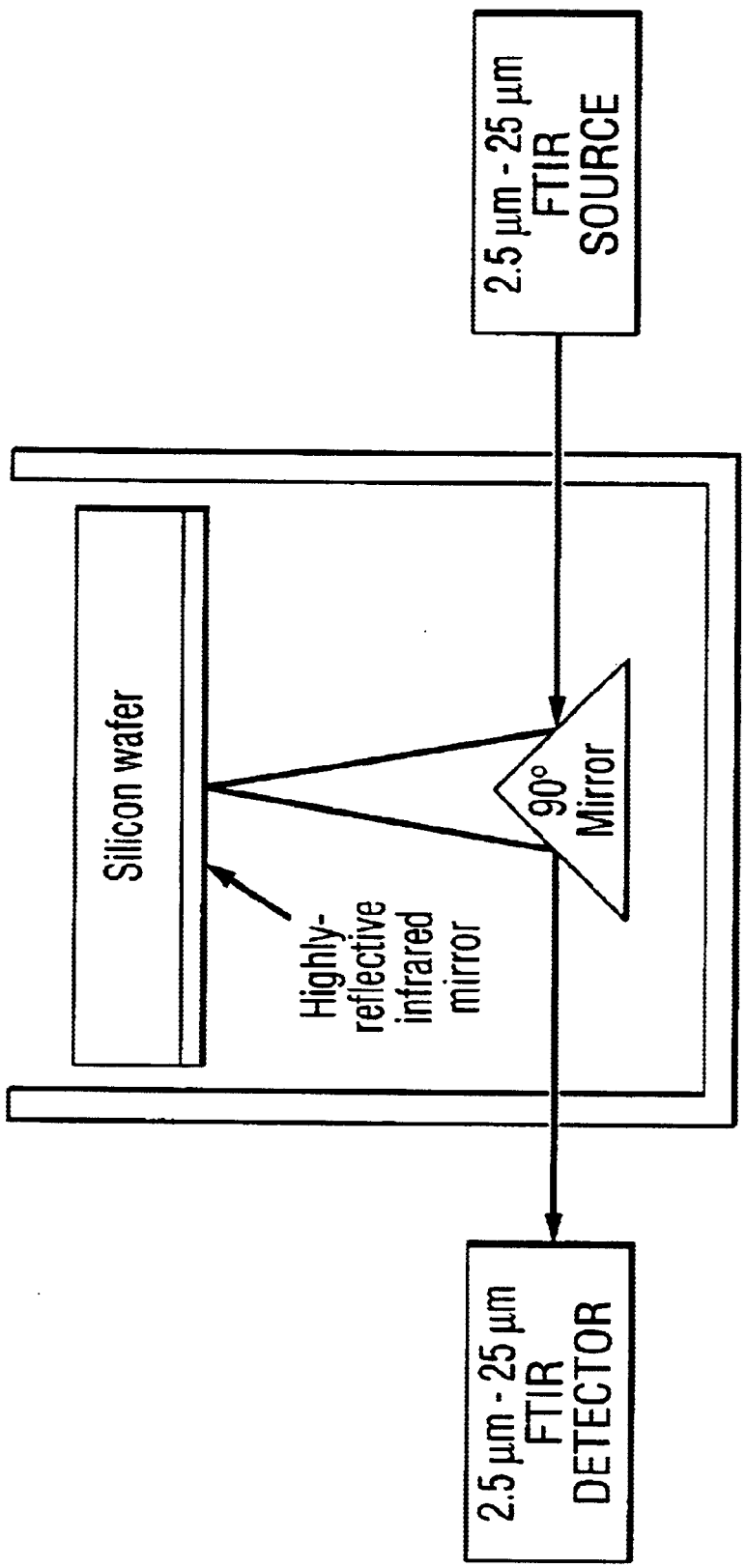
FIG. 16 shows the FTIR measurement of a highly reflective infrared mirror.

FIG. 16 shows the FTIR set-up used for the measurement of the specular reflectivity of the 50 nm, 100 nm and 150 nm thick highly reflective infrared mirrors by alternately replacing the calibration mirror by each one of the nine highly-reflective infrared mirrors.

Figure 17:
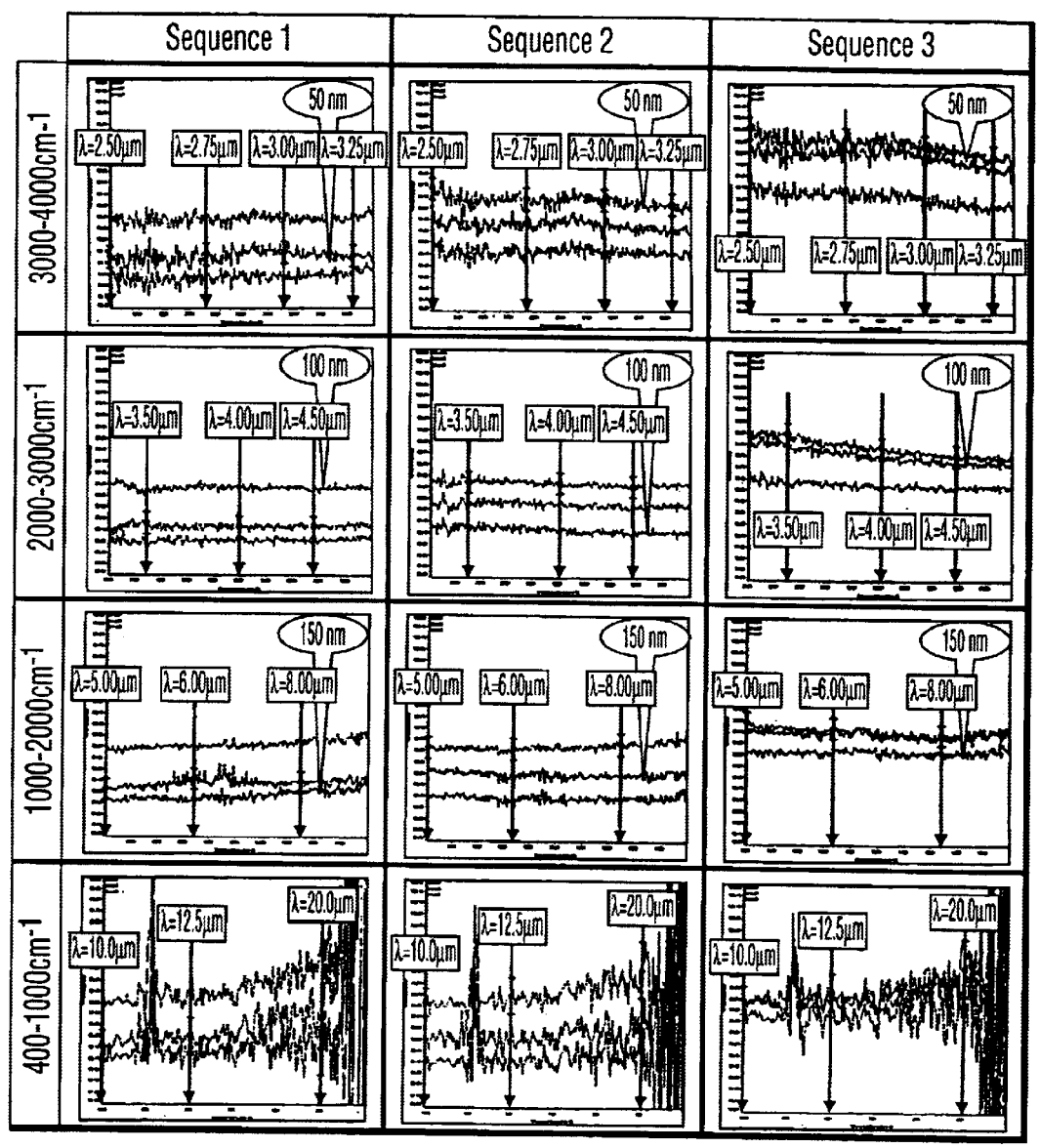
FIG. 17 shows the effect of the deposition sequence on the FTIR spectra of a highly reflective infrared mirror.

FIG. 17 shows the results of the calibrated FTIR measurements of the specular reflectivity of the 50 nm, 100 nm and 150 nm thick highly reflective infrared mirrors from 2.5 $\mu$m to 25 $\mu$m.

Figure 18:
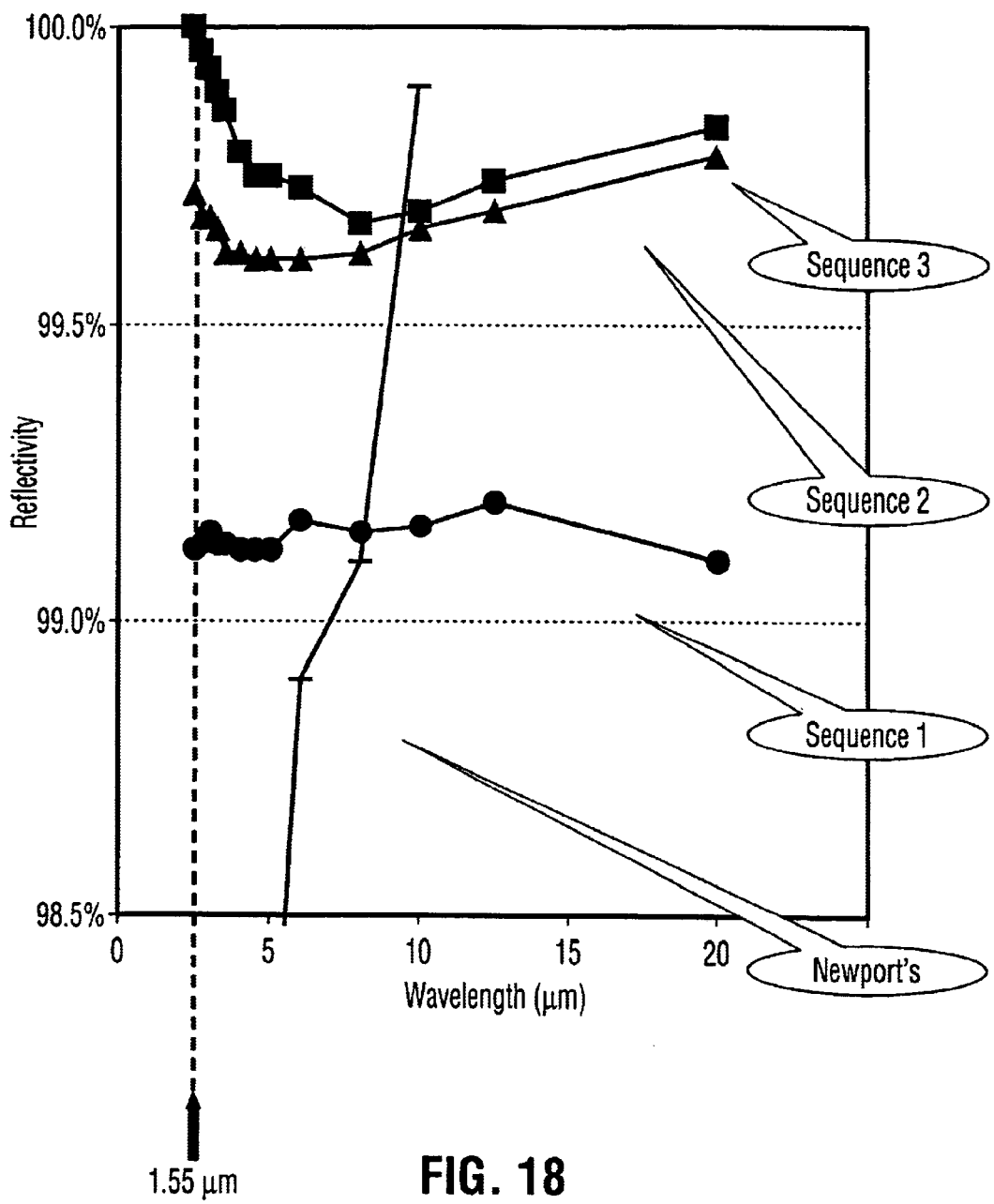
FIG. 18 is a performance comparison of the 50 nm thick highly reflective infrared aluminum mirrors with Newport's ER.1-PF enhanced aluminum mirror.

FIG. 18 compares the various 50 nm thick highly reflective infrared mirrors of FIG. 17 with the highly reflective ER.1 enhanced aluminum coating near infrared mirror of Newport Corporation of FIG. 4.

Figure 19:
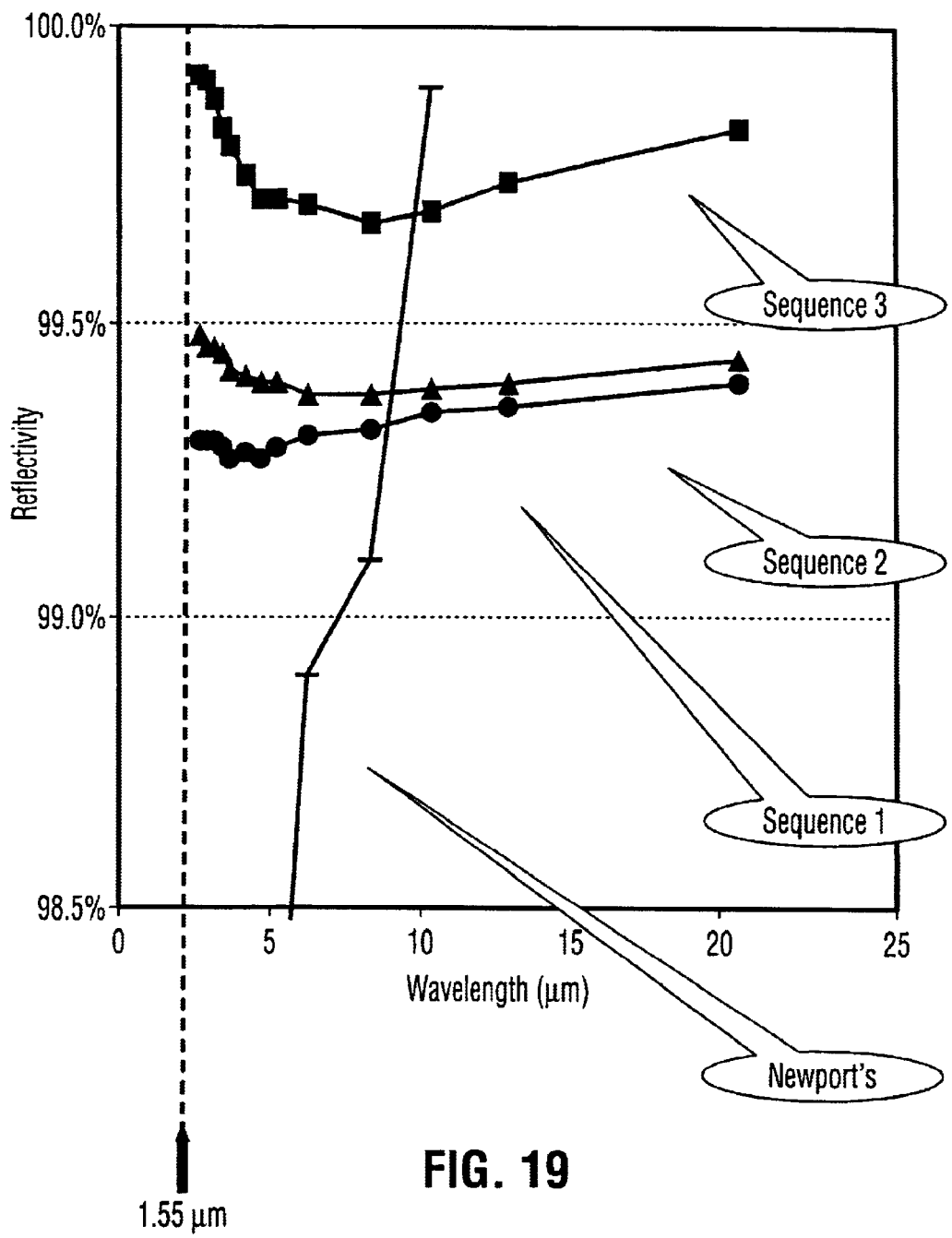
FIG. 19 is a performance comparison of the 100 nm thick highly-reflective infrared aluminum mirrors with Newport's ER.1-PF enhanced aluminum mirror.

FIG. 19 compares the various 100 nm thick highly reflective infrared mirrors of FIG. 17 with the highly reflective ER.1 enhanced aluminum coating near infrared mirror of Newport Corporation of FIG. 4.

Figure 20:
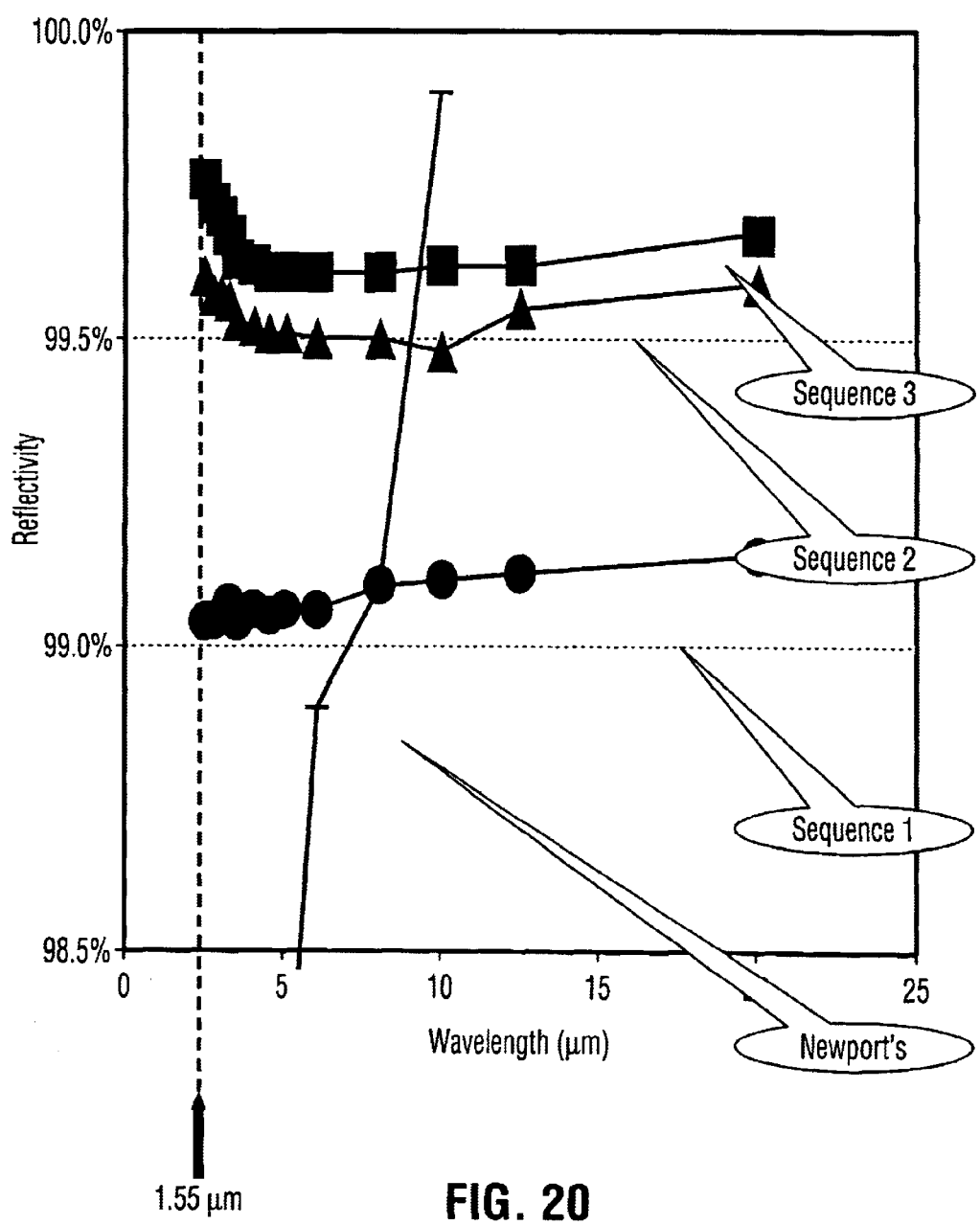
FIG. 20 is a performance comparison of the 150 nm thick highly reflective infrared aluminum mirrors with Newport's ER.1-PF enhanced aluminum mirror.

FIG. 20 compares the various 150 nm thick highly reflective infrared mirrors of FIG. 17 with the highly reflective ER.1enhanced aluminum coating near infrared mirror of Newport Corporation of FIG. 4.

The analysis of FIG. 13, FIG. 18, FIG. 19 and FIG. 20 shows that independently of the thickness from 50 nm to 150 nm, Sequence 3 provides a lower surface roughness than Sequence 2 and Sequence 1; independently of the thickness from 50 nm to 150 nm, Sequence 3 provides a higher infrared specular reflectivity than Sequence 2 and Sequence 1; independently of the thickness from 50 nm to 150 nm, Sequence 3 provides mirrors with higher specular reflectivity at smaller infrared wavelengths approaching 1.55 $\mu$m than at higher infrared wavelengths. This contrasts with Newport's infrared mirror which shows a very important infrared reflectivity loss as the wavelength is reduced from 10 $\mu$m to 1.5 $\mu$m; since 50 nm aluminum mirrors are already opaque at 1.55 $\mu$m and since 100 nm aluminum mirrors have less than 1 ppm transmission, it is clear that Sequence 3 provides a technique capable of producing extremely high quality infrared mirrors with atomic scale surface roughness and excellent specular reflectivity at 1.55 $\mu$m which can be used to produce infrared multiplexers, demultiplexers and other infrared optical devices.

It is clear from the above discussion that sequence 3 is capable of producing a mirror that has atomic scale surface roughness and highly-reflective specular reflection properties so as to allow the fabrication of optical devices such as multiplexers, demultiplexers and other optical devices operating in the 1.55 Mm and/or 1.30 $\mu$m optical bands with minimum optical losses.

Many variations will be apparent to one skilled in the art. The following are some variations, but one skilled in the art will appreciate that other variations will be possible within the spirit of the invention and scope of the appended claims.

The 90 seconds pre-heating at 485° C. could be shortened down to 30 seconds if the preheating temperature is higher than 485° C. but yet less than 600° C.; increased up to 180 seconds if the pre-heating temperature is lower than 485° C. but yet higher than 300° C. The SiO$_2$ etch at 485° C. could be performed at a different temperature than 485° C. in the range between 300° C. and 600° C.; remove less than an equivalent of 15 nm of SiO$_2$ in the range between 5 nm and 50 nm; be performed in another inert gas than pure argon, including: neon, krypton and xenon; be performed in a non-inert gas, including: a fluorine based gas, a bromine based gas or a chlorine based gas.

The 300 sec cooling at 25° C. could be shortened down to 30 seconds if the cooling is performed using an cold electrostatic chuck or any other means of active cooling; shortened down to 30 seconds if the cooling is performed at a temperature lower than 25° C. using a cryogenic means.

The 10 nm collimated titanium deposition at 25° C. could use a different deposition technique such as standard physical vapor deposition (PVD), enhanced PVD with an inductively coupled plasma (ICP), enhanced PVD with any means of magnetic confinement, chemical vapor deposition (CVD), plasma enhanced chemical vapor deposition (PECVD) or metal organic chemical vapor deposition (MOCVD); use a different thickness in the range between 1 nm and 100 nm; use a different titanium-based material or combination of titanium-based materials such as: titanium (Ti), titanium nitride (TiN) or titanium-tungsten (TiW); use a different material known to getter hydrogen, oxygen or nitrogen; be performed at a temperature different than 25° C. in the range between −100° C. and 100° C.

The aluminum mirror deposition at 25° C. could be performed at a temperature different than 25° C. in the range between −100° C. and 100° C.; use a different thickness in the range between 40 nm and 800 nm; use an aluminum-based material such as: aluminum-silicon, aluminum-copper, aluminum-silicon-copper or any other commonly used aluminum interconnect compound; be replaced by gold, silver, nickel or chromium.

The wafer out at 25° C. could be performed at a temperature different than 25° C. in the range between −100° C. and 100° C.

The Novellus M2i cluster tool could use chambers positioned at different locations than the ones of FIG. 10; use a different combination of chambers than the one of FIG. 10; be replaced by another Novellus cluster tool, such as Innova; or be replaced by another cluster tool, such as Endura, Endura XP or similar cluster tool from Applied Materials.

The obtained RMS surface roughness could be different than about 1 nm in the range between 0.2 and 40 nm.

The obtained specular infrared reflectivity could be measured by another means than FTIR, such as using a dye laser, a laser diode or any other means to produce a near infrared light; different than the results of FIG. 18 since thickness dependent between 50 nm and 150 nm; show a lower specular reflectivity at smaller infrared wavelengths approaching 1.55 $\mu$m than at higher infrared wavelengths;

The invention can be applied in other optical devices such as Add-After-Drop Filters (AADF) devices; Arrayed Wave Guide (AWG) and Arrayed Wave Guide Grating (AWGG) devices; Athermal Arrayed Wave Guide (AAWGG) devices; Charged Coupled Devices (CCD) devices; Distributed Feedback Laser Diode (DFB-LD) devices; Erbium Doped Fiber Amplifier (EDFA) devices; Fiber-To-The-Home (FTTH) application devices; Four Wave Mixing (FWM) devices; Fresnel Mirror (FM) devices; Laser Diode (LD) devices; Light Emitting Diodes (LED) devices; Mach-Zenhder (MZ), Mach-Zenhder Interferometer (MZI), Mach-Zenhder Interferometer Multiplexer (MZIM) devices; Micro-Opto-Electro-Mechanical Systems (MOEMS) devices; Monitor Photo Diode (MPD) devices; Multi-Wavelength Optical Sources (MWOS) devices; Optical Add/Drop Multiplexers (OADM) devices; Optical Amplifier (AF) devices; Optical Cross-Connect (OCC, OXC) devices; Optical Cross Point (OCP) devices; Optical Filter (OF) devices; Optical Interferometer (OI) devices; Optical Network Unit (ONU) devices; Optical Saw Wave (OSW) devices; Optical Splitter (OS) devices; Optical Switch (OSW) and Optical Switch Module (OSM) devices; Photonic ATM (PATM) switching devices; Planar Lightwave Circuits (PLC) devices; Positive Emitter Coupled Logic (PECL) devices; Quarter Wave (QW) devices; Receiver Photo Diode (RPD) devices; Semiconductor Optical Amplifier (SOA) devices; Spot-Size converter integrated Laser Diode (SS-LD) devices; Sub-Carrier Multiplexing Optical Network Unit (SCM-ONU) devices; Temperature Insensitive Arrayed Wave Guide (TI-AWG) devices; Thermo-Optic (TO) devices and Thermo-Optic Switch (TOS) devices; Time Compression Multiplexing—Time Division Multiple Access (TCM-TDMA) devices; Time Division Multiplexing (TDM) devices; Tunable Receiver (TR) devices; Uniform-Loss Cyclic-Frequency Arrayed Wave Guide (ULCF-AWG) devices; Vertical Cavity Surface Emitting Laser (VCSEL) devices; and Wavelength Dispersive Multiplexing (WDM), Wavelength Dispersive Multiplexing Transceivers (WDMT) devices;

We claim:

1. A method of making mirrors on a wafer in the manufacture of photonic devices, comprising the steps of:
    preheating a wafer to move adsorbed volatile contaminants at a temperature between about 300 and 600° C.;
    etching a surface of the wafer surface at a temperature between about 300 and 600° C. to remove absorbed contaminants in the presence of a glow-discharge to reduce poisoning;
    cooling the wafer surface so as to as reduce the surface mobility of the impinging metal atoms during a subsequent metallic deposition;
    carrying out a deposit on the cooled wafer of a gettering layer for gettering at least one contaminant selected from the group consisting of hydrogen, oxygen and nitrogen;
    depositing a metallic reflective layer in a deposition chamber; and
    removing the wafer from the deposition chamber to prevent excessive bulk oxidation.

2. A method as claimed in claim 1, wherein said gettering layer is deposited using collimated deposition.

3. A method as claimed in claim 2, wherein said gettering layer is made of titanium.

4. A method as claimed in claim 3, wherein said etching in the presence of a glow discharge is carried out in the presence of a non-inert gas selected from the group consisting of a fluorine based gas, a bromine based gas and a chlorine based gas.

5. A method as claimed in claim 1, wherein said gettering layer is deposited by a technique selected from the group consisting of standard physical vapor deposition (PVD), enhanced PVD with inductively coupled plasma (ICP), enhanced PVD with magnetic confinement, chemical vapor deposition (CVD), plasma enhanced chemical vapor deposition (PECVD) and metal organic chemical vapor deposition (MOCVD).

6. A method as claimed in claim 1, wherein said gettering layer is made of a material selected from the group consisting of a titanium-based material, titanium (Ti), titanium nitride (TiN) and titanium-tungsten (TiW).

7. A method as claimed in claim 1, wherein said metallic layer is aluminum.

8. A method as claimed in claim 1, wherein said etching in the presence of a glow discharge is carried out in the presence of an inert gas selected from the group consisting of pure argon, neon, krypton and xenon.

9. A method as claimed in claim 1, wherein said cooling step is carried out in the presence of a cooling chuck to reduce the cooling time.

10. A method of making mirrors on a silicon wafer in the manufacture of photonic devices, comprising:
    pre-heating the wafer for a duration between 30 and 180 seconds at temperature from 300 to 600° C. so as to eliminate adsorbed volatile contaminants;
    carrying out an $SiO_2$ etch at a temperature from 300 to 600° C. to remove absorbed contaminants using an argon plasma;
    placing the wafer in ambient at a temperature equal to or less than about 25° C. so to cool a surface of the wafer and reduce the surface mobility of the impinging aluminum atoms during a subsequent aluminum deposition;
    carrying out a collimated titanium deposition at a temperature in the range −100° C.–100° C. so as to deposit a gettering layer for hydrogen, oxygen and nitrogen;
    carrying out an aluminum mirror deposition at a temperature in the range −100° C.–100° C. so as to minimise surface diffusion and grain growth in a deposition chamber; and
    removing the wafer from the deposition chamber at a temperature in the range −100° C.–100° C. so as to prevent excessive bulk oxidation.

11. A method as claimed in claim 10, wherein said preheating step is carried out at a temperature of about 485° C. for a duration of about 90 seconds.

12. A method as claimed in claim 11, wherein said etching step is carried out at a temperature of about 485° C. for at time sufficient to remove about 15 nm of $SiO_2$.

13. A method as claimed in claim 11, wherein said cooling step is carried out for a duration of about 300 seconds at a temperature of about 25° C.

14. A method as claimed in claim 11, wherein said aluminum deposition takes place at a temperature of about 25° C.

15. A method as c aimed in claim 14, wherein the thickness of said deposited aluminum is 50 to 150 nm.

16. A method as claimed in claim 11, wherein the thickness of the deposited titanium gettering layer is about 10 nm.

17. A method as claimed in claim 11, wherein said wafer is removed from the deposition chamber at a temperature of about 25° C.

* * * * *